(12) United States Patent
Koren

(10) Patent No.: US 9,881,142 B2
(45) Date of Patent: Jan. 30, 2018

(54) METHOD AND APPARATUS FOR PREVENTING AND INVESTIGATING SOFTWARE PIRACY

(71) Applicant: Patrick Robert Koren, Bowie, MD (US)

(72) Inventor: Patrick Robert Koren, Bowie, MD (US)

( * ) Notice: Subject to any disclaimer, the term of this patent is extended or adjusted under 35 U.S.C. 154(b) by 0 days.

(21) Appl. No.: 14/852,206

(22) Filed: Sep. 11, 2015

(65) Prior Publication Data

US 2017/0076072 A1   Mar. 16, 2017

(51) Int. Cl.
*G06F 21/10* (2013.01)

(52) U.S. Cl.
CPC ................... *G06F 21/105* (2013.01)

(58) Field of Classification Search
CPC ...... G06F 21/105; G06F 21/12; G06F 21/121; H04N 21/44236
USPC .......................................................... 713/167
See application file for complete search history.

(56) References Cited

U.S. PATENT DOCUMENTS

| 6,792,510 B1* | 9/2004 | Wootton | G06F 12/0815 707/999.202 |
| 7,757,284 B1 | 7/2010 | Viljoen | |
| 8,966,211 B1* | 2/2015 | Arnon | G06F 13/102 370/338 |
| 2004/0193987 A1* | 9/2004 | Sigbjornsen | G06F 21/123 714/741 |
| 2010/0011447 A1* | 1/2010 | Jothimani | G06F 21/6209 726/27 |
| 2010/0306552 A1 | 12/2010 | LeVine et al. | |
| 2012/0185948 A1 | 7/2012 | Merkle, Jr. et al. | |
| 2013/0086643 A1 | 4/2013 | Morgan | |
| 2013/0232343 A1 | 9/2013 | Horning et al. | |

OTHER PUBLICATIONS

International Search Report and Written Opinion in corresponding PCT/US2016/050872 dated Nov. 29, 2016, 13 pages.

* cited by examiner

*Primary Examiner* — Dant Shaifer Harriman
(74) *Attorney, Agent, or Firm* — Harvest IP Law LLP

(57) ABSTRACT

An apparatus, method, and system for curtailing and investigating software piracy is provided. The method includes spawning user applications on a computer without use of a file on the file system. A protected application data source is retrieved by an operating system of the computer from a server and placed into a portion of memory not accessible by at least one application. The operating system also prevents the protected application data source from being written to the file system. In this manner there is no file subject to unauthorized distribution. The protected application data may also be watermarked by ordering at least one of executable functions, function call parameters, and program data according to a license identifier so that any two versions execute the same, but carry an identifier which can be used to trace piracy to the source.

10 Claims, 7 Drawing Sheets

METHOD AND APPARATUS FOR PREVENTING AND INVESTIGATING SOFTWARE PIRACY

BACKGROUND OF THE INVENTION

1. Field of the Invention

The present invention relates to a method, an apparatus, and portions thereof for prevention of software piracy and investigation of the source of piracy, and in particular to a feature of a computer which prevents software data from becoming a file which can be copied, and tagging the software and data for tracking the source of piracy if the software or data does become pirated.

2. Description of the Related Art

Generally, a software application (application for short) is executed on a computer using an operating system. Conventionally, the application is executed, for example, by a user by using a file associated with the application. As such, a file can be copied by a user for unlicensed distribution, i.e. pirated.

A number of schemes have been developed for curtailing software piracy. For example, upon installation, the application may require an authorization key or registration via a network connection. However, software pirates have historically been adept at circumventing such security features. Furthermore, once a software package is "hacked" so that keys and/or registration is no longer necessary, it may be easily distributed, and the software vendor generally has little recourse.

Accordingly, new software licensing models have subsequently been introduced. For example, software as a service (SAS) allows the software distributor to maintain control of the software using a thin client model whereby a client application analogous to a "dumb terminal" accesses a server controlled by the software vendor. The server provides data to the client application based on interaction with the client application, and the thin client allows the user interaction with the provided data.

However, such an approach frustrates the software user for several reasons. First, speed and reliability of a network connection can prevent the end user from satisfactorily using the software. Second, the server may go down, altogether preventing use of the software and rendering the thin client completely useless. Third, the user may not have confidence that the server will always be available, i.e. the software vendor goes out of business.

On the other hand, there are various hardware solutions (e.g. secured cryptoprocessor) to prevent unauthorized capturing of data such as used in ATM's or military embedded systems. However, these solutions involve considerable hardware changes not easily incorporated into the conventional desktop, laptop, etc. Furthermore, it is not possible to force a hardware solution on users who have already purchased conventional equipment.

Accordingly, there is a need for an improved model for preventing software piracy which does not have the aforementioned problems. Further, there is also a need to track a source of software piracy in the event that a pirate successfully hacks software which is supposed to be protected.

SUMMARY OF THE INVENTION

Accordingly, one or more embodiments provide a method, apparatus, and system to curtail software piracy and also to ascertain the source of software piracy by providing a mechanism to spawn an application on a computer without use of a file on the file system of the computer.

The mechanism to spawn an application may include retrieving protected application data from a protected application data source. The protected application data source may be at least one of a remote server, a local server, an attached hardware device, and a virtual server running on the computer. The protected application data may be stored in the virtual server after first retrieving the protected application data from a different protected application data source. The protected application data may be prevented from being written to a file system of the computer.

The mechanism to spawn an application may further include copying the protected application data to an unused portion of computer memory which is inaccessible by at least one application existing on the computer. The mechanism to spawn an application may further map a virtual address space of the application to the unused portion of computer memory which is inaccessible by at least one application existing on the computer.

The protected application data may be watermarked by using source code and an identifier such that an order of at least one of functions, data, and call parameters is different between a first protected application data corresponding to a first identifier and a second protected application data corresponding to a second identifier.

The mechanism to spawn an application may be implemented in an operating system of the computer. The operating system may be watermarked such that an order of at least one of functions, data, and call parameters is different between two licensed versions of the operating system. The operating system may be self mutating such that at least one of data and code is altered by execution of the operating system between a stored image of the operating system and a running image of the operating system.

The protected application data may be encrypted when retrieved from the protected application data source and decrypted before storing in the unused portion of computer memory which is inaccessible by at least one application existing on the computer.

The computer may undergo authentication and authorization when accessing the protected application data source.

BRIEF DESCRIPTION OF THE DRAWINGS

The above and/or other aspects will become apparent and more readily appreciated from the following description of embodiments, taken in conjunction with the accompanying drawing, in which.

DETAILED DESCRIPTION OF THE PREFERRED EMBODIMENTS

The following description of a conventional computer and its respective operation is provided merely as an example upon which one or more embodiments may be implemented. As one skilled in the art may appreciate, the following description is merely an example, and embodiments are not necessarily limited to following description.

Figure 1:
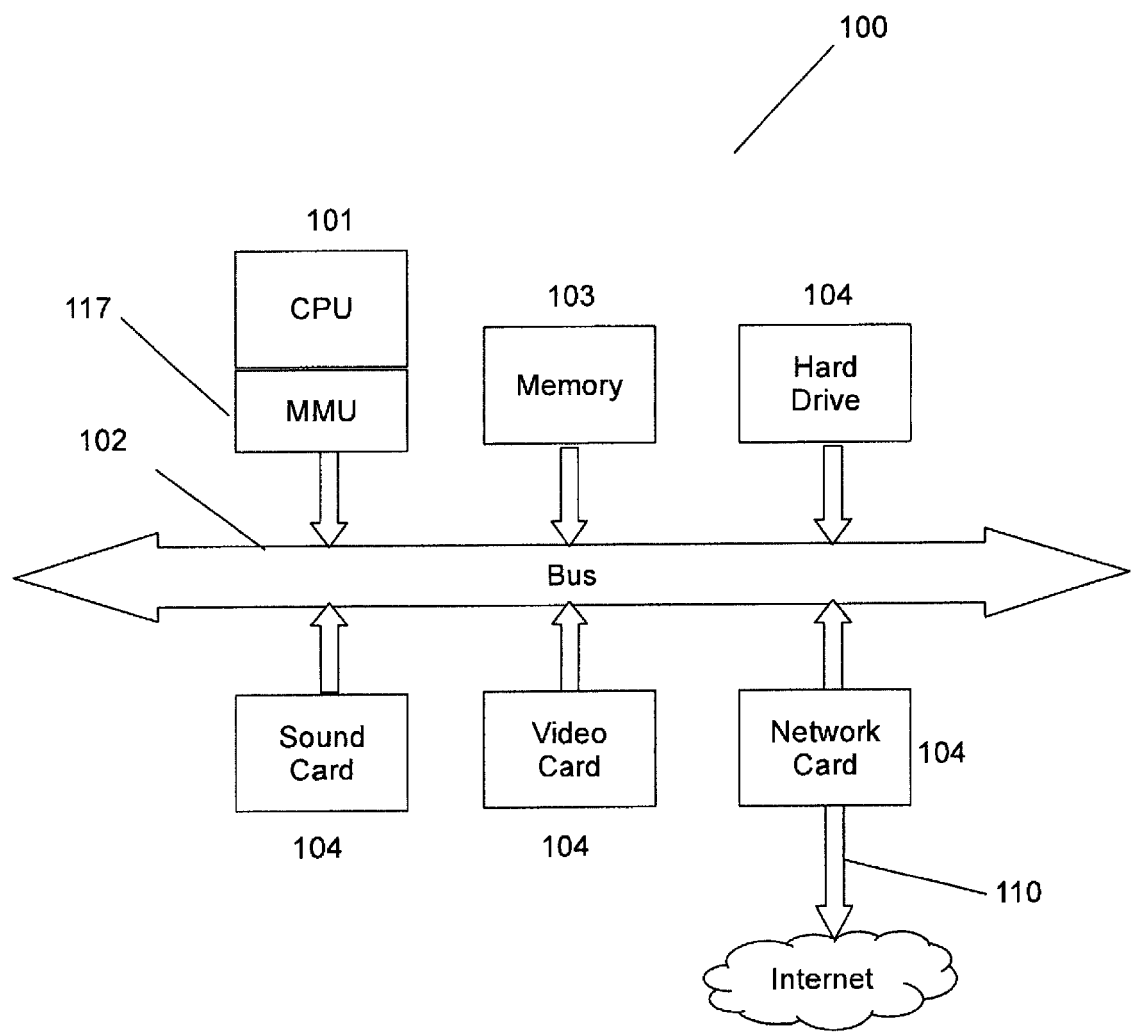
FIG. 1 illustrates a generic computer usable with an embodiment.

A conventional computer 100, usable in an embodiment, is illustrated in FIG. 1. A central processing unit 101 (CPU or processor) may interface a bus 102. The bus 102 may provide access between the CPU 100, memory 103 (such as RAM, ROM, etc.), and various input/output (I/O) devices 104. The various I/O devices may be, by way of non-limiting example, video input and/or output, audio input and/or output, mouse, keyboard, standard interfaces (WiFi, Ethernet, RS-232, USB, etc.) In some computers, at least one of the I/O devices may be some form of storage such as a non-transitory computer readable read/write storage medium which may be, by way of non-limiting example, a hard drive, flash drive, RAID, network access storage, etc. One or more I/O devices 104 may also provide a network interface 110.

Many modern processors 101 further contain a memory management unit (MMU) 117. The MMU translates virtual addresses used by software into bus addresses. In this manner, when software is executed on the CPU, the address used by the processor when executing a CPU instruction (i.e. a virtual address) is converted to the address used to access the bus 102. This approach has the advantage that it is possible to prevent one application from either inadvertently or intentionally corrupting memory (either executable instructions or data) for another application or the operating system. One aspect of an embodiment uses the MMU 117 to curtain software piracy by using the MMU 117 in an unconventional manner as will be explained below.

Although bus address and physical address are not universally the same thing, in some implementations, the bus address and the physical address are the same. Without loss of generality, and for the purpose of simplifying the discussion, the terms "bus address" and "physical address" are used interchangeably throughout this description. However, embodiments do not specifically depend on any particular relationship between bus address and physical address, and are, therefore, not limited to this specific example. This particular model is chosen for simplicity of explanation only.

An operating system is a piece of software which manages access to computer resources and manages the execution or spawning of user application software as a "process" or "application" (used interchangeably herein). When an application requires access to any of the I/O devices 104, the application makes an operating system call. For example, a Windows application that needs to create a window (e.g. an "OK" message box) might call CreateWindow( ) or CreateWindowEx( ) which are Win32 API calls. The Windows operating system handles access to the particular video hardware (e.g. monitor or other display) in the computer 100 to display an OK dialog box. As another example, a Linux application might call printf ("Hello world\n"); and the Linux operating system handles access to the particular video hardware in the computer 101 to display "Hello world" and a carriage return in, e.g. a terminal window such as a "bash shell" on a Gnome desktop.

The operating system also typically handles the execution (also termed "spawning") of all applications. For example, in Windows, a user might use a mouse to click an icon to launch Internet Explorer. The Windows operating system ascertains that the icon is uniquely associated with a file such as iexplore.exe which is Internet Explorer. The Windows operating system uses data within the file, iexplore.exe, to create a new application, and begins running the new application in its own virtual address space managed by MMU 117.

Figure 2:
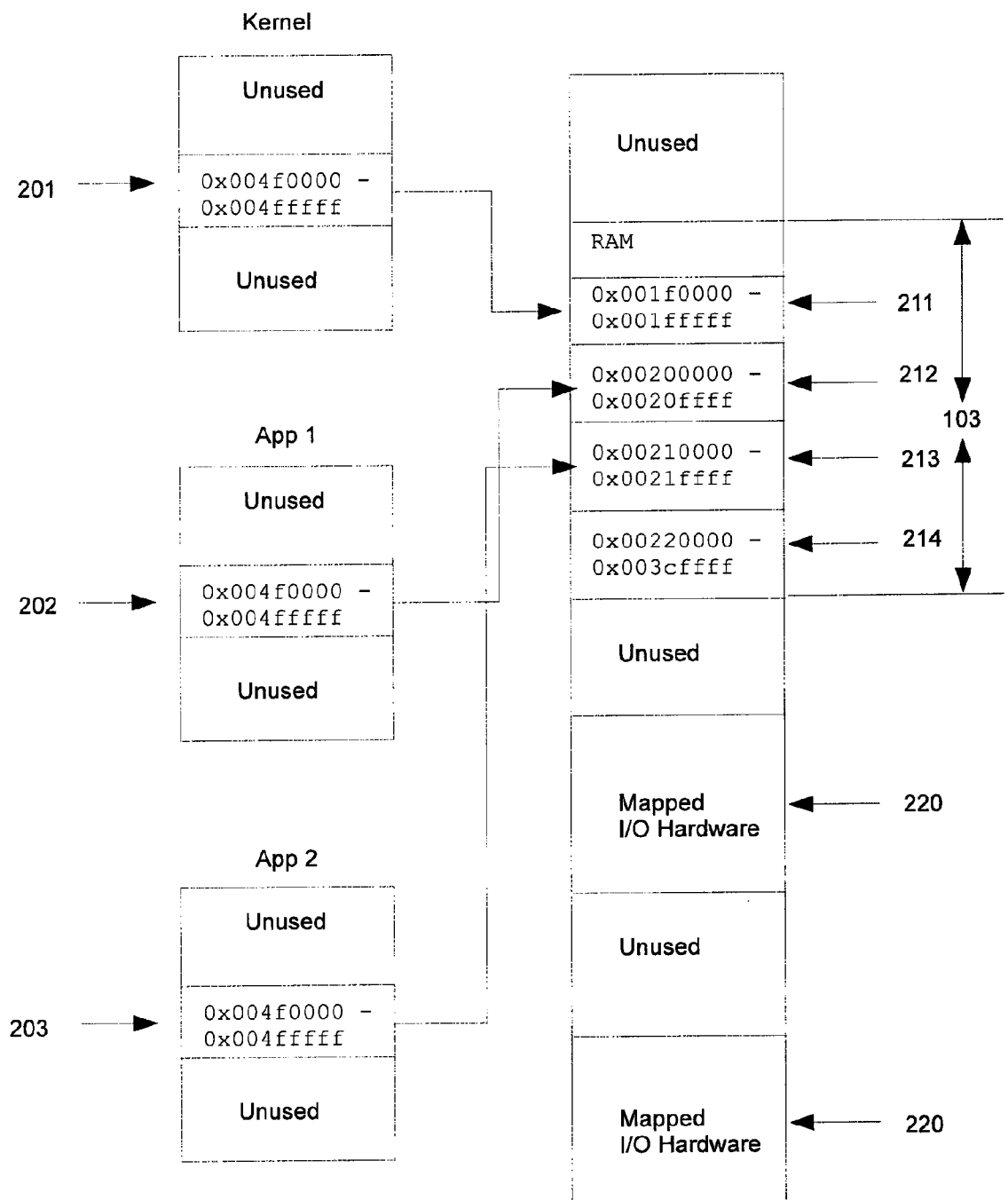
FIG. 2 illustrates a memory management scheme usable with an embodiment.

A conventional operating system typically includes at least a kernel, which is the software which controls access to all I/O devices 104, memory 103, etc., and also manages the page tables for the MMU 117 to convert (also termed "map") virtual addresses into bus addresses. In conventional operating systems such as Windows, Linux, or Mac OS, etc., the operating system kernel has its own virtual address space known as "kernel space". Similarly, each application spawned by the operating system has its own unique virtual address space, often referred to as "user space". FIG. 2 depicts a very simplified mapping, using MMU 117, of several virtual memory spaces (kernel, App 1, and App 2) into the bus addresses, and particularly into memory (RAM) 103. In particular, a portion 201 of a 32 bit kernel virtual space and portions 202 and 203 of application virtual spaces for App 1 and App 2 (also known as "user spaces") are mapped into physical memory 103. For example, the portion 201 of kernel virtual space from 0x004f0000 through 0x004fffff is mapped to the portion 211 of physical memory 103 from 0x001f0000 to 0x001fffff. Similarly, App 1 has a virtual address space of which portion 202 from 0x004f000 to 0x004fffff is mapped to physical memory 103 from 0x0020000 to 0x0020ffff, and so forth. In this manner, when a piece of operating system kernel code has an instruction which references 0x004f1234, the physical memory 103 address which is accessed is 0x001f1234. The mappings between the various virtual spaces are contained in page tables used by the MMU 117.

FIG. 2 represents an overly simplified view of virtual to physical address space mapping which does not reflect the typical mappings of typical memory management schemes which may contain discontiguous mappings. Embodiments do not depend upon the simplified picture of FIG. 2a, which are simplified for explanatory purposes only.

The operating system may spawn a new application by creating a new and unique virtual address space for the application, and handling the address mapping from this new virtual address space to physical address space using page tables and the MMU 117. In particular, the virtual address space of the application is typically mapped only to physical memory, and not mapped to the I/O devices 104. The operating system also copies executable data and possibly also program data to physical memory corresponding to some portion of the application's virtual address space. Finally, the operating system configures the computer's processor to execute the application in its own virtual address space using MMU 117. Referring again to FIG. 2, the operating system may spawn App 1 by copying data from an executable file corresponding to App 1 to various portions of portion 212 of physical memory from 0x00200000 to 0x0020ffff. The operating system also creates a new process, and starts executing code beginning at some address (perhaps identified in the executable file) in the physical memory from 0x00200000 to 0x0020ffff.

One feature of a conventional operating system is that the operating system has access to the full physical address space. A conventional operating system typically controls all access to I/O hardware and all physical memory, including the memory used by applications. In contrast, any given application may typically have access limited to only to a portion of the memory assigned to that application by the operating system. In this manner, a faulty process can cause harm only to itself, and will not cause harm to other running applications or to the operating system, thereby rendering the computer unrecoverable and requiring a re-boot.

Figure 3:
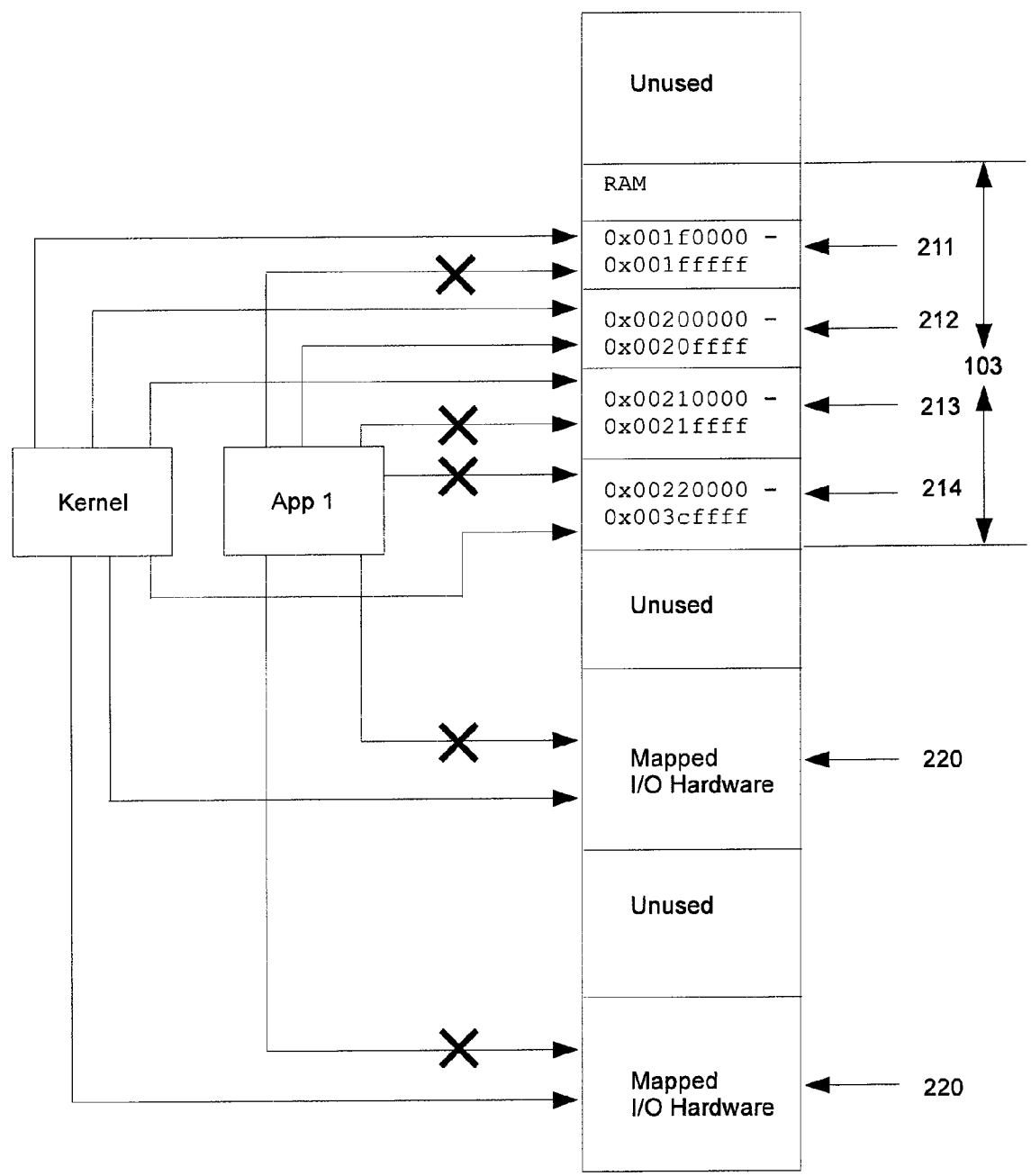
FIG. 3 illustrates a other aspects of a memory management scheme usable with an embodiment.

FIG. 3 depicts attempted bus access by both the kernel and App 1 in the same address space layout as FIG. 2. Recall that App 1 has a portion of its virtual address space 202 mapped to memory portion 212 and that the kernel has a portion of its virtual address space 201 mapped to memory portion 211. Note how the operating system kernel has access to all system resources, including the respective memories of all the applications, and even unused memory. However, applications are unable to access anything outside the space that the operating system kernel allows, particularly by using MMU 117. For example, App 1 may access memory portion 212 which the operating system assigned to a portion 201 of App 1's virtual memory space. The kernel is also depicted as being able to access memory portion 212. However, App 1 is not (depicted in FIG. 3 with "x's") able to access memory portions 211 (kernel code/data), 213 (App 2's physical memory), or 214 (unused RAM memory). App 1 is also prevented from accessing Mapped I/O Hardware 220. On the other hand, the kernel is able to access everything.

One way an application is prevented from accessing anything other than its own memory is by simply not mapping at least some portion of the user space addresses (i.e. virtual addresses) to any corresponding bus addresses. For example, consider the following C-language program:

```
// helloAndCrash.c
#include <stdio.h>
int main (void)
{
    char* crashAndBurn = (char *) 0xdeadbeef; // address not mapped
    printf ("Hello world.\n");
    *crashAndBurn = 'e'; // 'e' is for end (of the world)
    return 0;
}
```

If the foregoing application is compiled and executed on a computer running, for example, Ubuntu Linux 12.04, the application "crashes" upon attempting to execute *crashAndBurn='e'. This is because the 32 bit address 0xdeadbeef is not mapped to any physical bus address. When MMU 117 detects an attempted illegal access such as in the above program, an exception or interrupt may be generated, thereby alerting the operating system. Therefore, after printing "Hello world." and a carriage return (denoted "\n" in the C-language printf ( ) function) to the console (bash shell), the program ends with a message from the operating system indicating "Segmentation fault (core dumped)". Because not every piece of a user space address of any particular application is mapped, it is neither necessary nor desirable to map any portion of the user space to the I/O devices 104, the physical memory of any other application, the physical memory of the kernel, etc.

If an application requires more memory to be mapped than what was initially mapped by the kernel, the kernel of the operating system may provide one or more mechanisms to allocate more memory for the application. For example, the C-language function, malloc( ), or the C++ operator, "new", may be used to map more physical memory to the application's virtual user space to accept, for example, data retrieved over a network connection, or an array being computed by the user application. However, the bus addresses corresponding to I/O devices 104 might typically not be mapped to the user space with operating system memory allocation mechanisms such as the above. Rather, only memory 103 may typically be mapped to the portion of the user virtual space using, e.g. malloc( ) or new.

Figure 4:
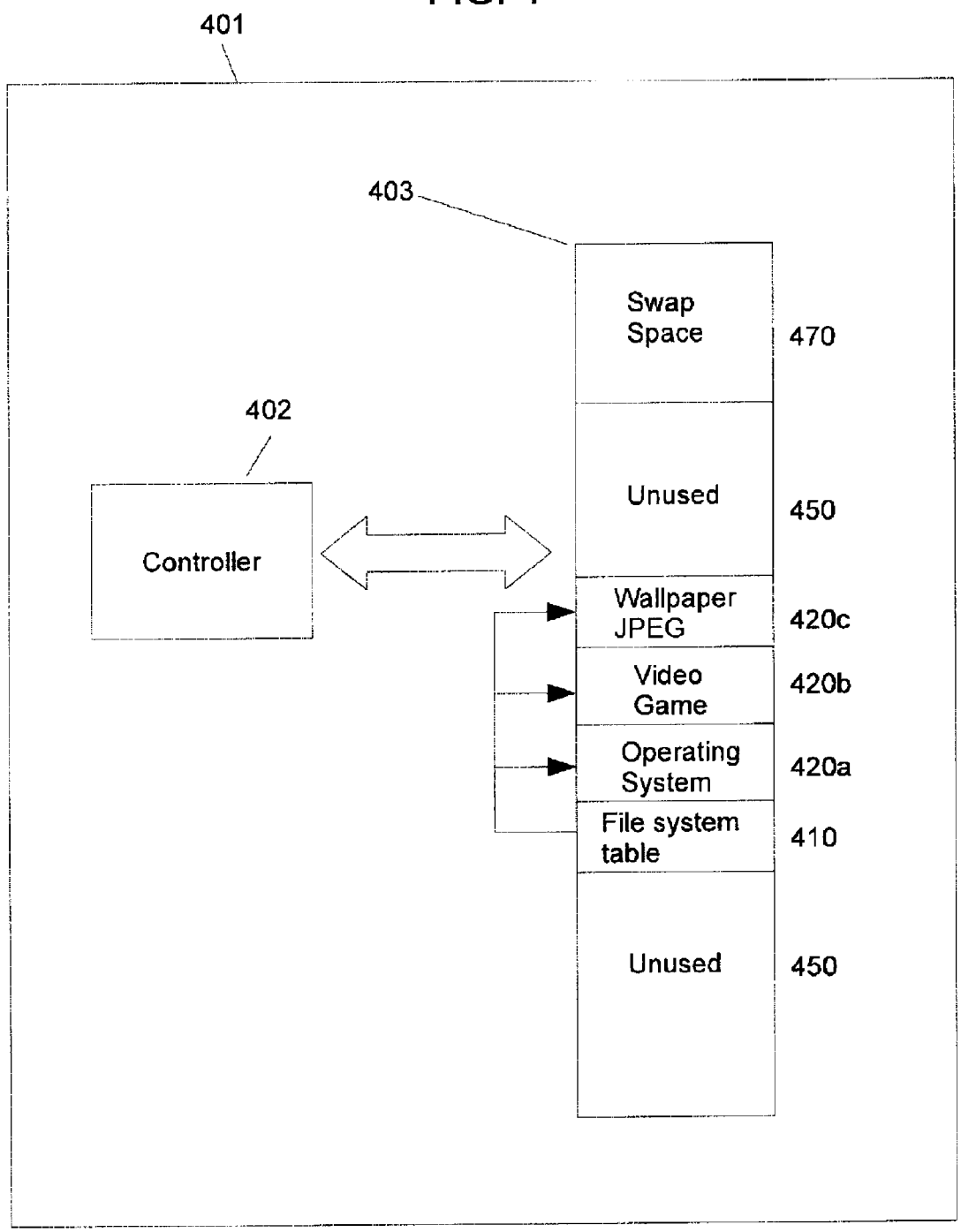
FIG. 4 illustrates a non-transitory computer readable storage medium containing a file system which is usable with an embodiment.

The operating system conventionally spawns a new process or application using an executable file on the computer's file system. A file system is an abstraction used by the operating system, and is not an exhaustive picture of what is stored on, e.g. a hard drive. FIG. 4 illustrates a simplified conventional file system stored, for example on a hard drive 401. The hard drive 401 comprises controller 402 which interfaces non-volatile memory 403 which may arranged in contiguous sectors or blocks. A file system may be a data structure stored in the non-volatile memory 403. A file system may, in this very simplified example have at least some index or allocation table 410 which points to files 420a, 420b, and 420c. The remainder of the hard drive is unused by the file system and may be represented as unused space 450, part of which is the swap space (described later). Only index 410 and files 420a-c represent the file system, whereas unused space 450 is not part of the file system. However, unused space 450 may be used to store a new file, and index 410 is updated to point to the new file, and then this portion of unused space 450 becomes part of the file system.

Note that FIG. 4 depicts file system space stored contiguously on the hard drive 401. The illustration of FIG. 3 is very simplified for illustration purposes only, and embodiments do not rely upon and are not limited by the simplified depiction of FIG. 4. Modern file systems such as Windows NTFS and FAT32, or Linux ext3, etc. do not necessarily store file system contiguously as shown in FIG. 4. Furthermore, these and other file systems can easily be adapted for use with one or more embodiments as shown below.

Also depicted in FIG. 4 is a swap space 470. If the operating system detects that a running application needs more RAM memory than is available in the system, the operating system may borrow a portion of the RAM memory from another running application. In this manner, the contents of the portion of memory borrowed from one application may be written to the swap space on the hard drive 401. The MMU 117 is then reconfigured to map some portion of the virtual address space of some application or the kernel to the portion of newly freed RAM memory. When the operating system detects that the first application needs to run again, the memory may again be swapped out with the swap space so that the second application's memory contents are now on the hard drive 401, while the first application's memory contents are written back into RAM memory.

An executable file on the file system, for example in Windows, may be presented in Portable Executable format and contain various headers and data for both executable code and program data. The Windows operating system uses the data within the file to initialize an unused portion of the physical memory (e.g. unused portion 214 of RAM 301 as depicted in FIG. 2) corresponding to at least a portion of a virtual address space, in particular, a new user space, created for the application. The Windows operating system spawns a new process with the new user space, executing the code in physical memory. As another example, Linux analogously uses another executable file format called ELF for executable files.

In the above examples, one thing conventional operating systems and all conventional applications have in common is that they have a corresponding file which is accessible to a user, even if protected in some capacity. For example, the file may require administrator (Windows) or root (Linux) permission to access the file. At any rate, there is always a file involved in spawning any application, or even to load the kernel of the operating system. Accordingly, because the executable software exists as a file, that file is always at risk for unauthorized copying by a user. One or more embodiments helps prevent users from unauthorized distribution of software as shown below.

Although the above background review is provided, particular embodiments may not specifically require a computer such as above. As described below, according to an embodiment, there may be an unused portion of RAM memory such as portion 214 which is not visible to at least one application, but is visible to the operating system kernel, and, perhaps certain special purpose system applications. Therefore, any computer/operating system configuration which is able to provide an unused RAM portion which is not visible to at least one application may be used according to an embodiment. The above description is merely provided for context and explanatory purposes.

Figure 5:
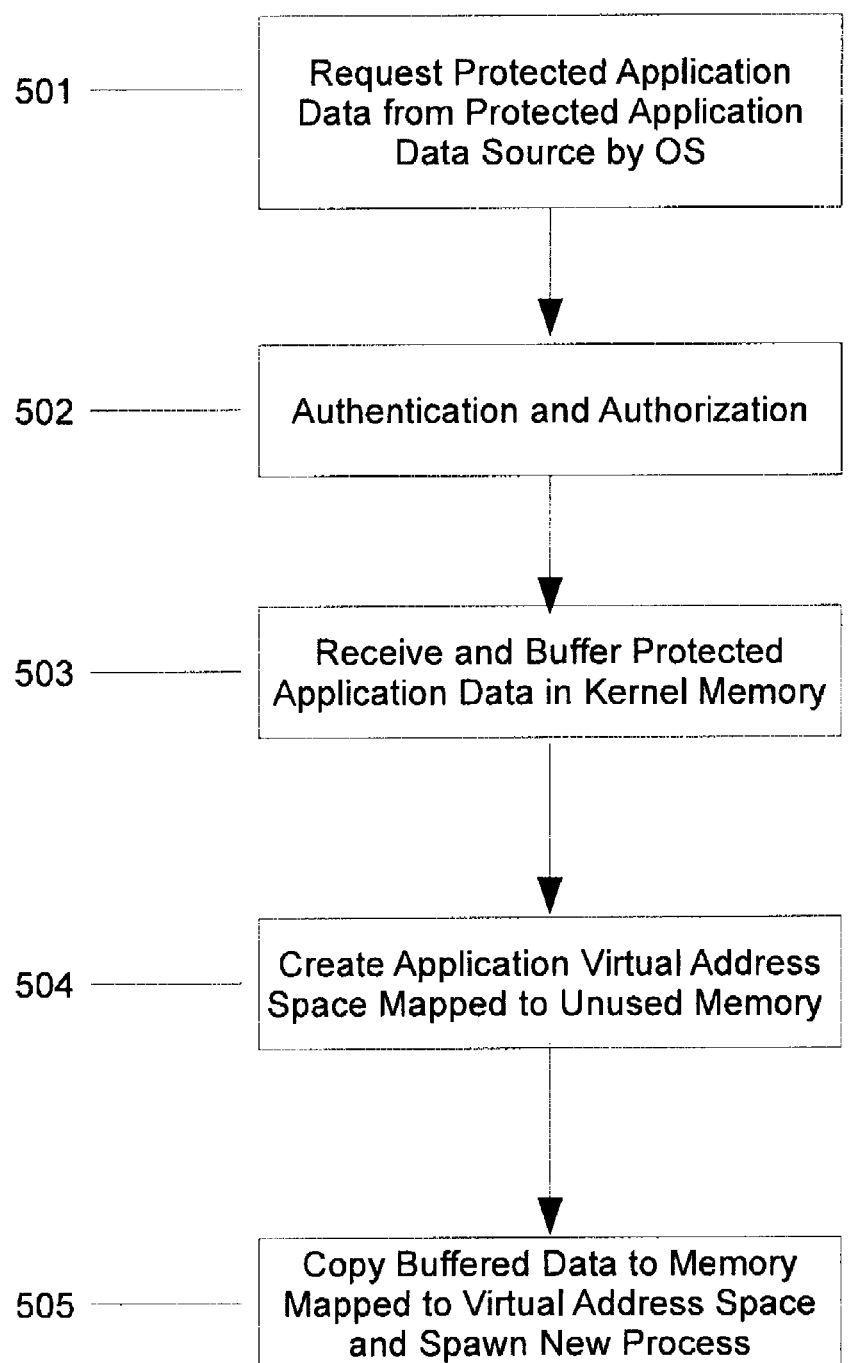
FIG. 5 illustrates a method of spawning an application using protected application data according to an embodiment.

According to an embodiment, an operating system of a computer has functionality which allows a process or application to be spawned without use of a file on the computers file system corresponding to an application. FIG. 5 is a flow chart according to an embodiment. As such there is no file for a software pirate to copy. Instead, a protected application data source which is external to any user accessible file system may be interfaced to retrieve protected application data (e.g. executable code and possibly program data). The protected application data source may be directly interfaced by the operating system to provide the same data that ordinarily is provided by a file, and the data is copied into physical memory corresponding to the new virtual address space of an application which is about to be spawned by the operating system. However, the protected application data source is not generally accessible outside of the operating system, i.e. inaccessible by at least one user application.

FIG. 5 is a flow chart according to an embodiment. At operation 501, the operating system makes a request for the the protected application data from the protected application data source. At operation 502, the protected application data source authenticates the request to ensure that the request is legitimate, e.g. the request is received from a licensed copy of the operating system rather than a malicious application. At operation 503, the protected application data source provides data to the operating system indicating the respective virtual address location(s) and size(s) of data, including at least data comprising executable code. At this point the protected application data may be buffered in kernel memory which is inaccessible outside of the operating system. At operation 504, the operating system allocates physical memory 103 and sets up page tables for MMU 117 to map the new virtual space of the new application into physical memory 103 corresponding to the data received in operation 503. Finally, at operation 505, the operating system copies the received protected application data to application memory and spawns a new process using the new virtual user space and the data placed into memory 103 from the protected application data source.

Although FIG. 5 specifically depicts buffering in kernel space, it can be appreciated that the data may alternatively be read from the protected application data source directly into the unused memory which either will be or already has been mapped to the application virtual space. The general inventive concept can be carried out in a multitude of ways which are well known in the art without departing from the spirit of the invention, as long as the protected application data is neither generally visible to other applications (save special purpose system applications) and is prevented from being stored on the file system.

The protected application data source may be, for example, a networked server, an external device interfaced to the computer (e.g. using USB, Ethernet, WiFi, etc.) or an internal device or virtual device (e.g. virtual server) implemented as a feature of the operating system. Alternatively, more than one protected application data source may be used. In any case, the data provided would always be directly placed into physical memory, and the operating system spawns a new process (including mapping the process virtual address space to the same portion of physical memory) after the data is placed into physical memory. In no case would the protected application data ever exist as a file on a user accessible file system. The operating system according to an embodiment prevents the protected application data from ever being written to a file on the file system.

Therefore, because the operating system spawns a new application using the data from the protected application data source, no user application could have access to the data. Therefore, if a software pirate intends to capture the data from the protected application data source in order to create an executable file, the pirate may be forced to access the memory through the kernel. Therefore, ideally the kernel would not provide any API which could be used to access the data in physical memory from the protect application data source. Further, the kernel may implement protection from run-time loadable kernel modules which could be used to hack the data. For example, the operating system could implement conventional protection rings such as the 3 ring protected mode of an x86 processor. In this manner, a pirate would be forced to use dedicated hardware such as a bus analyzer, and this is beyond the means of a conventional software pirate.

In order to frustrate any potential software pirate, the data may be encrypted when it is retrieved over a network connection. In this manner, the pirate would be unable to capture the network packets using, e.g. a packet sniffer, WireShark, etc. to be assembled into anything useful since the pirate does not have the encryption key.

If, for example, a software vendor wishes to maintain complete and intimate control over a licensed software application (e.g. per use authorization), a user could be limited to access of the software only via a network connection to one or more servers which are, in turn, controlled by the software vendor. In this case, the application would be downloaded by the operating system, after proper authentication and authorization, from a remote server which functions as the protected application data source. The new application may then be spawned according to the process in FIG. 5.

The above example has an advantage over the SAS model because the application would be running local instead of a different application running remotely and outputting data to the user's thin client. Accordingly, network bandwidth is not a problem once the application is running on the user's local machine. However, users may be frustrated by a model which still requires a network connection to access software as with the SAS model.

Alternatively, the software application could be provided by a local server. A local server may be a network attached server inside the same LAN as the computer, a USB system on a chip, an internal hardware server, or a virtual server implemented within the operating system to use "unused space" 450 of hard drive 401 to store the protected application data.

In the case of a USB system on a chip, or USB dongle, the USB dongle would not provide direct access to the data as with a conventional USB memory device. Rather, the USB dongle would appear much as a networked server, being a system on a chip. In particular, the USB dongle may only be configured to provide data to the operating system which would copy the data to physical memory, and use the data to spawn a new process whereby a portion of the virtual address space of the new process is mapped to the physical memory where the data is stored. The USB dongle could utilize a protocol that is unique to the dongle, and which the operating system is alone programmed to access. An embodiment which utilizes a USB dongle is not limited to any particular protocol, and any protocol known in the art or becomes known in the art could be used as a flexible design choice. Therefore, any protocol could be developed to suit the particular needs of the software vendor utilizing the USB dongle. Choice of a particular protocol is beyond the scope of this Application.

The developer of the USB dongle may find it advantageous to make the dongle configurable. For example, the USB dongle may be purchased in a "virgin" state. Upon connecting the dongle to a particular computer, the operating system creates an encrypted bridge between the dongle and a remote server. The remote server then teaches the dongle a secret handshake that is unique to the operating system. The handshake may or may not be unique to a particular license of the operating system. If the handshake is unique to the particular licensed copy of the operating system, then the software will be executable only on one particular computer.

Although the above description is particularly directed to a USB dongle, it can be appreciated that at least some of the same or similar features could be used in other protected application data sources, such as a server on a LAN, or a virtual server implemented within the operating system.

It may be advantageous, depending on the protected application data, have a relatively small amount of data which is necessary for the application to execute. Therefore, according to an embodiment, much, but not all, of the data needed to execute the application could be stored in files on the file system, for example, in a Windows DLL, or a Linux shared object. The DLL or shared object could perform the "heavy lifting", but would be otherwise useless without the small core application. The DLL or shared object could then be a file on the file system.

Alternatively, the portion of the data on the protected application data source may be merely a decryptor for encrypted data stored in a file on the file system. Although such a file can be copied, it is useless without the protected core application to decrypt it. The protected application data source may use an operating system call to allocate one or more large blocks of memory for the application to copy the decrypted file contents. Upon decrypting the encrypted file contents and placing into the appropriate memory locations, the core application then executes the decrypted contents. Because the encrypted file may be required to execute from a particular memory location, the operating system memory allocation call may be a special purpose call to allocate memory not only of a certain size (such as C++ new or C malloc) but also starting address within the virtual memory space.

The USB and remote networked examples of protected application data sources share an inconvenience to an end user. For example, if the protected application data source is a networked server, the user would be required to maintain a network connection. Despite that the application runs locally, thereby eliminating the problem of network connection speed and stability once the application is running, users may feel frustrated if they lack ownership, and are required to access an application only using a network connection. Furthermore, if network connectivity is unavailable, the application which the user has paid money for will not run. A user may feel similarly frustrated if required to connect a USB dongle every time access to a particular application (or several applications if the USB dongle is "configurable) is desired. A user may also feel frustration if required to use a networked server on a LAN.

Therefore, according to an embodiment, there could be more than one protected application data source. In particular, and by way of non-limiting example, the first protected application data source could be a remote networked server, and the second protected application data source could be a virtual server implemented within the operating system. Data corresponding to a protected application could be encrypted and stored on the hard drive 401, but not stored in the file system. Referring again to FIG. 4, data for the virtual server could be stored in unused space 450. Therefore, in this example, the hard disk drive 401 would store both file system data and also protected application data accessible only by the operating system kernel. The kernel would then control both the file system data and protected data being stored on the hard drive. Again, it is advantageous to encrypt the protected application data when stored locally to frustrate pirate efforts to circumvent the operating system. For example, if a pirate boots to, e.g. a Linux CD, and writes a kernel module which allows complete visibility into the hard drive, then the pirate will retrieve only garbled data when looking outside of the Windows file system in the Windows partition.

Therefore, an application need only be downloaded from a remote server once, and then stored in the virtual server of the operating system on a local hard drive, but outside the file system. In this manner, there is no file for a user to copy, and there is also no need to access the remote server once the application data is first retrieved from the remote server and stored locally on the hard disk outside of the file system in a virtual server of the operating system.

Figure 6:
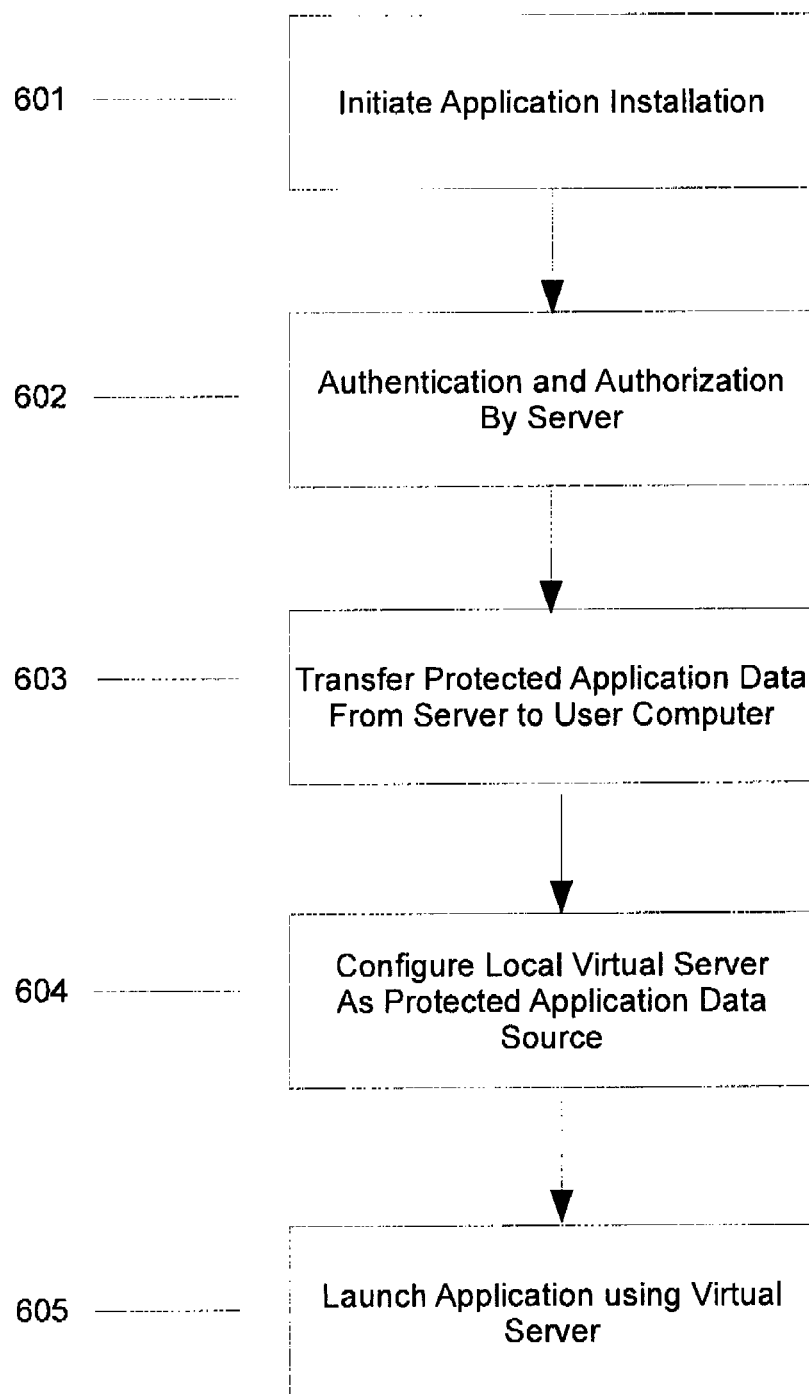
FIG. 6 illustrates use of multiple protected application data sources according to an embodiment.

FIG. 6 is a flow chart detailing retrieval of protected application data from a remote server for local storage in the virtual server implemented by the operating system. At operation 601, the user elects to install an application. By way of non-limiting example, the user may insert a CD into the computer which contains encrypted data readable by the operating system. The operating system provides an interface that the use may select to install the application corresponding to the CD. Based on the data in the CD, at operation 602, the operating system may perform a secret handshake with the remote server to authenticate and authorize transmission of data from the server. The secret handshake may include a handshake uniquely associated with the particular CD, and may further include a handshake uniquely associated with the license of the operating system. In operation 603, data (ideally—but not necessarily—encrypted) is transferred from the server to the computer. In operation 604, the computer uses the data transferred from the server and, in some instances, also data from the CD, to create the data to set up the local virtual server as a protected application data source for use in executing the protected application. In operation 605, the user elects to use the application. In operation 605, the operating system implements the method depicted in FIG. 5, specifically using the local virtual server as the protected application data source, to launch the application.

Although the above description is particular to use of a CD for software installation, according to an embodiment, a CD may or may not be necessary. As an alternative example, the user may use a web browser to interface a software vendor's website in lieu of using a CD.

However, there is a problem with retrieving data from a remote server. In particular, there should ideally be some mechanism to guarantee that it is the operating system which is attempting to access the remote server, and not a malicious application used by a software pirate. Accordingly, it is desirable for the operating system and the remote server to undergo authentication and authorization for retrieving the data. For example, the operating system could be programmed with an electronic handshake to guarantee that it is not some pirate application. Although any conventional means of authentication and/or authorization which is known in the art or which later becomes known in the art may suffice, a particular method is detailed below.

If the data is stored, for example, on a virtual server embedded within the operating system, then future access of the software application would no longer require a network connection. However, software pirates are historically adept at cracking anything which is locally stored, even if not stored in the proper file system. For example, a computer may be booted to, e.g. a bootable CD with Linux and loaded with a kernel module which allows direct access to the hard drive on a block by block basis. As such, all data stored on the hard drive is available for reverse engineering, even data not stored within the file system.

The aforementioned techniques render software piracy exceedingly difficult. Nevertheless, a determined pirate may still circumvent all of the above. Therefore, according to an embodiment, the application data could be unique to a particular license so that if a pirated copy of the software application is found, it can uniquely be associated with a particular purchaser who violated the terms of the software license agreement.

Figure 7:
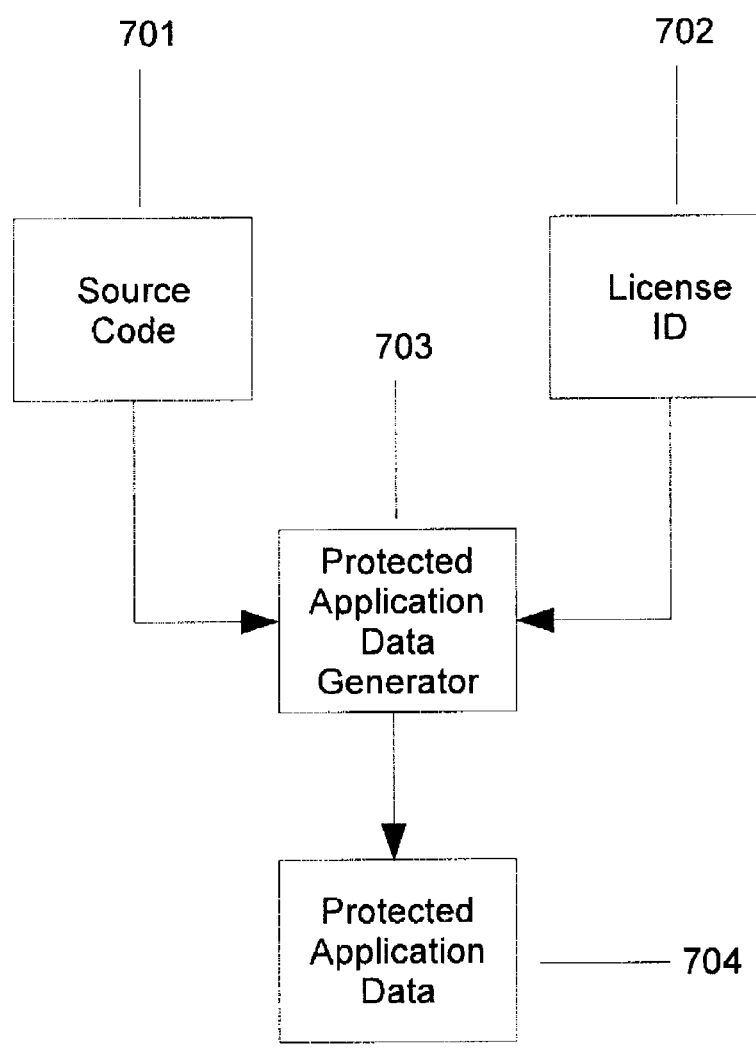
FIG. 7 illustrates watermarking of protected application data according to an embodiment.

FIG. 7 depicts a scheme for watermarking software according to a license identifier. Source code 701 and identifier 702 are input into a protected application data generator 703 to generate the protected application data 704. For a particular software package, the source code 701 may always be the same, while the identifier 702 may be uniquely associated with a license. Therefore, each protected application data 704 may be different and uniquely associated with identifier 702.

For example, the protected application data 704 could be uniquely adapted by rearranging the order of subroutines in the executable code data. Considering two functions, foo( ) and bar( ), in one license, bar comes first and foo come second in the executable code data. In another license, foo( ) and bar( ) are in the opposite order in the executable code data.

As another example, a C function, int foo (int a, float b, char* c), could be rearranged in all permutations of the call variables. That is, in one license, foo has call parameters pushed onto the stack in the order: int a, float b, and char* c. In another license, foo has the call parameters pushed onto the stack in a different order: float b, int a, char* c. Similarly, program data, such as static variables could be similarly rearranged in memory. A special dedicated purpose code mutating compiler could be used which turns source code into executable code which is so rearranged so that the rearranged code is uniquely associated with a particular software license corresponding to identifier 702.

Also, depending upon the interplay between the various variables, some function could be broken out into multiple functions in some software versions. For example, int foo (whatever_t* pData, int a, float b, char* c) might be well represented in two consecutive function calls, bar (whatever_t* pData, int a) and then baz (whatever_t* pData, float b, char* c). If the call order of bar( ) and baz( ) are unimportant, then another example of rearrangement would be to reverse their respective call orders, or even to shuffle other function calls in between. That is, not only can bar( ) and baz( ) occur in different places within the executable code, even the calls to bar( ) and baz( ) may be arranged differently within, for example, fct( ).

Accordingly, one software license may have executable data corresponding to the following C code:

```
void foo (int a, float b, whatever_t* pData, char* c)
{
    fct (b, pData, c, a);
}
``` whereas another software license may have executable code rearranged to correspond to:

```
void foo (whatever_t* pData, char* c, int a, float b)
{
    bar (a, pData);
    baz (c, pData, b);
}
and yet another license may look like:
void foo (int a, float b, char* c, whatever_t* pData)
{
    baz (c, b, pData);
    bar (pData, a);
}
```

All three of the above examples have different executable code, but all three examples accomplish exactly the same thing upon execution of foo( ). However, if a software pirate reverse engineers the code, the pirate may not realize that the code itself is essentially a fingerprint or watermark. Therefore, if the software was purchased via a license using a credit card and/or other identifying information, and hacked software turns up in, e.g. some peer-to-peer network, or the pirate forgets to remove a "call home" feature, then it becomes obvious who hacked the software, and appropriate measures can be taken against the identified pirate.

The code rearrangement above could also be used for subroutines, e.g. in DLL's, which are stored as files on the user accessible file system as opposed to the protected application data source. In this fashion, the DLL's would work only with the correct version of the executable application since the order in which call variables are pushed onto the stack must match between the DLL and the application.

In this fashion, a software pirate would need to recompile DLL's and/or application executable code in order to avoid detection. At this level of effort, most pirates will regard piracy as too much trouble to be worth the effort.

Moreover, there is an advantage to scrambling executable code and data. If this technique is applied to kernel code, then the kernel will be less susceptible to attacks such as buffer overrun or the like. It also becomes easier to hide the handshake between the operating system and the networked remote server using security through obscurity. That is, the operating system can hide the actual operation as shown below.

As indicated above, the authentication and authorization of a particular operating system can be any method known or that becomes known in the art. However, a particular method takes advantage of the scrambled executable kernel code and data. For example, bitwise operations on seemingly random kernel space variables could be sprinkled throughout the kernel code in such a manner that by the system is up from a fresh boot, all of the operations will have already taken place. Some of the operations may even be, for example, an MD5 hash or equivalent upon portions of the code or kernel variables, the result being stored in seemingly random portions of the kernel variable space—the randomness being peculiar to a particular operating system license. In this manner, there is a lot of pseudorandom data in the kernel variable space which can be used to generate, for example, a cryptographic key for communicating with the external server. The data is pseudorandom because no two licensed versions of the kernel have the same code and/or variables in the kernel space. Also, the result is deterministic since the same kernel variables and code would always be loaded in the same way with each boot sequence. In this manner, some of the variables stored in kernel space look like "garbage memory" with random junk. Furthermore, the state of the "garbage memory" changes from the initial load to the time when the "random junk" is used. Therefore, the operating system must not only be loaded but also executed before any handshake between the operating system and external server could be reverse engineered.

In other words, the operating system, being scrambled according to the license identifier, may also be self mutating, albeit in a deterministic manner, as the operating system code executes at system boot. In this manner, the memory image of the kernel is in a completely different state after system boot than on, e.g. the hard drive. Therefore, it is advantageous to prevent installation of loadable kernel code (i.e. kernel modules, device drivers, etc.) which has full access to the kernel memory, such as with conventional protection rings so that a pirate does not have access to the fully and deterministically mutated kernel memory image. Further, each licensed copy is different, so each pirate would have to separately reverse their own licensed copy of the operating system in order to hack a protected application data source to generate a pirated and copyable file.

A "minefield" of unpublished operating system API's could be coded into the OS. Again, the "minefield" could be unique to the particular license of the operating system. The operating system may prevent any application other than a predetermined application from using any of the unpublished API's. For example, in Windows, the predetermined application may be Windows Explorer, and Windows Explorer would be a protected application data to thwart reverse engineering efforts. Therefore, not only does the pirate not have access to the Windows Explorer code to figure out how to trick the operating system into interfacing the remote server for illicit means, but also, the Windows operating system would prevent any process other than Windows Explorer from successfully using the unpublished API's.

Typically, the operating system API's may be a software interrupt. Therefore, in order to add further obscurity, a plurality of unused unpublished API's could be coded for any given operating system license, and only one functions to interface the server, where the others function to warn the server that this particular license is in the process of being hacked. This could be accomplished by each using different encryption keys generated from different "garbage memory". Each API, to the hacker, looks like it exchanges a private encryption key using, for example, a public key infrastructure supplied by the external server. However, when the server gets the wrong key, the software vendor knows that the pirate guessed wrong. In the most extreme scenario, the software vendor could send a self destruct message which wipes out protected software and may include the operating system. However, the particular action taken by the software vendor is a matter of design choice.

The same of similar action could be taken when an unauthorized application uses the unpublished API. For example, if an application other than Windows Explorer attempts to use the correct API from among all of the "minefield" API's.

Another technique for obscuring the operation of the operating system is to mutate various jump addresses of the kernel code while the computer is booting. In this manner, the hard drive image of the kernel code is the worst possible form of what is colloquially known as "spaghetti code", and practically unreadable by a human since the code appears to call functions which are not the functions actually called by the running kernel. By breaking functions into many small functions, and hiding what function is calling what function in the disk image, most pirates will not regard then endeavor as being worth the effort.

Furthermore, some or all of the above obscuring techniques can be accomplished by the same special purpose compiler used for generating watermarked code.

At least some of the same or similar techniques can also be used to further obscure how and where protected application data is stored outside of the file system by the virtual server.

It can be appreciated, however, that complete integration of the software piracy protection scheme into each unique license of the operating system is not necessary. For example, the features of the operating system necessary to communicate with an external server and manage spawning of an application may be implemented in any kernel level code, such as a loadable kernel module or device driver. Such an approach can be usable with legacy operating systems which were not delivered with features usable to implement the software piracy protection scheme.

Furthermore, it can be appreciated that a kernel module or device driver can be used to implement a virtual server to function as the protected application data server despite any lack of a legacy operating system's support for allocating hard drive space outside of the file system. For example, a legacy operating system may not recognize hard drive space that is being used for the virtual server because the operating system simply considers that hard drive space as unused. Therefore, the legacy operating system may simply overwrite hard drive space corresponding to the virtual server in the ordinary course of file management. To overcome this shortcoming, the kernel module or device driver may overwrite the first instructions of file management routines of the legacy operating system with redirecting jump instructions to file management routines of the device driver customized to accommodate both the legacy operating system's file system as well as the virtual server. In this manner, a software vendor may not be required to rely upon an operating system vendor to protect software.

Furthermore, it can be appreciated that only portions of the above schemes may be implemented while still being useful. For example, if none of operating system, kernel module, or device driver support is available to prevent the protected application data from being copied, then the software may still be watermarked on a per-license basis by reordering portions of the protected application data according to one or more parts of the aforementioned scheme. In this manner, although the software vendor may have difficulty preventing unauthorized distribution of the protected application data, the software vendor may have still recourse in the event that unauthorized distribution occurs. Furthermore, the watermarking may be used in combination with techniques already known in the art to help thwart unauthorized distribution.

It can be appreciated that any of the above described embodiments can be implemented as hardware, e.g., at least one hardware based processing unit including at least one processor capable of implementing any above described embodiment, as well as a combination of hardware and software and/or firmware.

The methods described above may also be implemented through computer readable code/instructions stored in/on a medium, e.g., a non-transitory computer readable storage medium, to control at least one processing element to implement any above described embodiment. The medium can correspond to a non-transitory medium/media permitting the storing or transmission of the computer readable code. The computer readable medium may also be embodied in at least one application specific integrated circuit (ASIC) or Field Programmable Gate Array (FPGA).

The computer readable code can be recorded or transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media. The media may also be a distributed network, so that the computer readable code is stored or transferred and executed in a distributed fashion. Still further, as only an example, a processing element could include at least one processor or at least one computer processor, and processing elements may be distributed or included in a single device.

According to an aspect of the embodiments of the invention, any combinations of one or more of the described features, functions, operations, and/or benefits can be provided. The word (prefix or suffix article) "a" refers to one or more. A combination can be any one of or a plurality. The embodiments can be implemented as an apparatus (a machine) that includes hardware for performing the described features, functions, operations, and/or benefits, for example, hardware to execute instructions or software, for example, computing hardware (i.e., computing apparatus), such as (in a non-limiting example) any computer or computer processor that can store, receive, retrieve, process and/or output data and/or communicate (network) with other computers.

According to exemplary embodiments, the described features, functions, operations, and/or benefits can be implemented by and/or use computing hardware and/or software executed by computing hardware. For example, a processing apparatus may comprise a computing controller (CPU) or computing processing system (e.g., one or more processing devices (e.g., chipset(s), including memory, etc.) (e.g., a hardware logic circuitry based computer processor(s)) that processes or executes instructions stored in a memory, namely software/program), computer readable media (e.g., that stores information objects), transmission communication interface (network interface), input device, and/or an output device, for example, a display device, and which can be in communication among each other through one or more data communication buses.

In addition, an apparatus can include one or more apparatuses in a computer network which are capable of communication with each other or other devices within or external to the computer network. A computer processor can refer to one or more computer processors in one or more apparatuses or any combinations of one or more computer processors and/or apparatuses. An aspect of an embodiment relates to causing and/or configuring one or more apparatuses and/or computer processors to execute the described operations. The results produced can be output to an output device, for example, displayed on the display. An apparatus or device refers to a physical machine that performs operations, for example, a computer (physical computing hardware or machinery) that implement or execute instructions, for example, execute instructions by way of software, which is code executed by computing hardware including a programmable chip (chipset, computer processor, electronic component), and/or implement instructions by way of computing hardware (e.g., in circuitry, electronic components in integrated circuits, etc.)—collectively referred to as hardware processor(s), to achieve the functions or operations being described. The functions of embodiments described can be implemented in any type of apparatus that can execute instructions or code.

More particularly, programming or configuring or causing an apparatus or device, for example, a computer, to execute the described functions of embodiments of the invention creates a new machine where in case of a computer a general purpose computer in effect becomes a special purpose computer once it is programmed or configured or caused to perform particular functions of the embodiments of the invention pursuant to instructions from program software. According to an aspect of an embodiment, configuring an apparatus, device, computer processor, refers to such apparatus, device or computer processor programmed or controlled by software to execute the described functions.

Although embodiments have been shown and described, it should be appreciated by those skilled in the art that changes may be made in these embodiments without departing from the principles and spirit of the disclosure, the scope of which is defined in the claims and their equivalents. Since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A method comprising:
generating, on a first computer of a server, a first protected application data using a source code and a first identifier, the first protected application data including instructions executable by a second computer to implement a new application on the second computer;
transmitting the first protected application data from the server to the second computer;
storing, using an operating system executing on the second computer, the first protected application data in an unused portion of a RAM memory interfaced to the second computer, the unused portion of the RAM memory being inaccessible by other applications executing on the second computer, the RAM memory storing the executing operating system and at least one application executing on the second computer from among the other applications executing on the second computer;

preventing, by one or a combination of the operating system and the second computer, access by the other applications executing on the second computer to the first protected application data stored in the unused portion of the RAM memory;

mapping a virtual address space for the new application to the unused portion of the RAM memory storing the first protected application data;

executing the instructions included in the first protected application data at the virtual address space for the new application to thereby spawn the new application on the second computer;

storing the first protected application data in a local server; and preventing storage of the first protected application data in the file system of the second computer;

wherein the first protected application data is different from a second application data generated using the source code and a second identifier, the difference comprising an order of one or a combination of functions, data, and call parameters of one or more of the functions, enabling identification of a source of unauthorized distribution of one or a combination of the first protected application data and a modified version of the first protected application data.

2. The method according to claim 1, wherein the first protected application data is encrypted by the server before the transmitting, and is decrypted by the second computer before the storing the first protected application data in the unused portion of the RAM memory.

3. The method according to claim 2, wherein:

the operating system is self-mutating so that an image of executable kernel code that is stored in a non-volatile storage medium is different from a RAM memory image of the executable kernel code, the self-mutation is deterministic, so that the RAM memory image of the executable kernel code is the same each time the operating system is loaded by the second computer, at least one function of the image of the RAM memory image executable kernel code is changed by the self-mutation to a security function, the at least one function corresponds to one or a combination of:

the storing the first protected application data in the unused portion of the RAM memory, the spawning the new application, the storing the first protected application data in a local server, and the preventing the storage of the first protected application data in the file system of the second computer, and the security function, upon execution by a user application, performs one or a combination of reporting to a third party that the second computer is attempting unauthorized access to the first protected application data, deleting the first protected application data from local server, and disabling part or all of the operating system.

4. The method according to claim 1, wherein after the storing the first protected application data in the local server and upon a subsequent execution of the new application, repeating:

the storing the first protected application data in the unused portion of the RAM memory using the first protected application data stored in the local server rather than the transmitted first protected application data, the mapping the virtual address space for the new application to the unused portion of the RAM memory storing the first protected application data, and the executing the instructions included in the first protected application data at the virtual address space for the new application to thereby spawn the new application on the second computer.

5. The method according to claim 4, wherein the local server is a virtual server implemented by the operating system and using storage outside of any file system of the second computer.

6. The method according to claim 4, wherein the local server is implemented outside of the operating system in a device connectable to the second computer, the device being a server interfaced to the computer through a local area network or directly connectable to the computer.

7. A method comprising:

generating, on a first computer of a server, a first protected application data using a non-executable source code and a first identifier, the first protected application data including instructions executable by the second computer to implement a new application on the second computer, the non-executable source code being coded in a human readable high level language compilable into binary code executable by the second computer;

transmitting the encrypted first protected application data from the server to the second computer, wherein the first protected application data is different from a second application data generated using the source code and a second identifier, the difference including an order of one or a combination of functions, data, and call parameters of one or more of the functions, enabling identification of a source of unauthorized distribution of one or a combination of the first protected application data and a modified version of the first protected application data.

8. A method comprising:

receiving, by an operating system of a computer, encrypted first protected application data from a source outside of a file system of the computer;

decrypting the encrypted first protected application data to generate first protected application data, the first protected application data including instructions executable by the computer to implement a new application on the computer;

creating a virtual address space for the new application to be executed on the computer;

mapping, according to contents of the first protected application data, unused RAM memory among RAM memory of the computer to the virtual address space for the new process, the unused RAM memory being inaccessible by other applications executing on the computer, the RAM memory containing the executing operating system and at least one process executing on the computer;

storing data including the instructions from the first protected application data in the unused RAM memory which is mapped to the virtual address space;

preventing, by one or a combination of the operating system and the computer, access by the other applications executing on the computer to the first protected application data stored in the unused RAM memory which is mapped to the virtual address space;

executing, by the computer the instruction included in the data as the new process; and preventing, by the operating system, the protected application data from being stored on the file system of the computer.

9. The method of claim 8, wherein:

the operating system is self-mutating so that an image of executable kernel code that is stored in a non-volatile storage medium is different from a RAM memory image of the executable kernel code, the self-mutation is deterministic, so that the RAM memory image of the executable kernel code is the same each time the operating system is loaded by the computer, at least one function of the image of the RAM memory image executable kernel code is changed by the self-mutation to a security function, the at least one function corresponds to one or a combination of:
  decrypting the encrypted first protected application data,
  creating the virtual address space,
  mapping the unused RAM memory of the computer to the virtual address space
  storing the data from the first application data in the unused RAM memory, and
  executing the instructions included in the data as the new process, and the security function, upon execution by a user application, performs one or a combination of reporting to a third party that the computer is attempting unauthorized access to the first protected application data, deleting the first protected application data from local server, and disabling part or all of the operating system.

10. The method of claim 7, further comprising encrypting the first protected application data before the transmitting.

* * * * *